(12) United States Patent
Zheng et al.

(10) Patent No.: US 12,470,276 B2
(45) Date of Patent: Nov. 11, 2025

(54) TERMINAL AND BASE STATION

(71) Applicant: NTT DOCOMO, INC., Tokyo (JP)

(72) Inventors: Xufei Zheng, Beijing (CN); Liu Liu, Beijing (CN); Hiroyuki Kawai, Tokyo (JP); Lan Chen, Beijing (CN); Jing Wang, Beijing (CN); Hiroki Harada, Tokyo (JP); Satoshi Nagata, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 331 days.

(21) Appl. No.: 18/259,442

(22) PCT Filed: Dec. 28, 2020

(86) PCT No.: PCT/CN2020/140146
§ 371 (c)(1),
(2) Date: Jun. 27, 2023

(87) PCT Pub. No.: WO2022/140915
PCT Pub. Date: Jul. 7, 2022

(65) Prior Publication Data
US 2024/0063883 A1 Feb. 22, 2024

(51) Int. Cl.
*H04B 7/06* (2006.01)

(52) U.S. Cl.
CPC ....... *H04B 7/06952* (2023.05); *H04B 7/0632* (2013.01)

(58) Field of Classification Search
CPC .... H04B 7/06952; H04B 7/0632; H04B 7/06; H04B 7/0695; H04B 7/088; H04W 24/10; H04W 72/04; H04W 16/28
See application file for complete search history.

(56) References Cited

U.S. PATENT DOCUMENTS

| | | | |
|---|---|---|---|
| 2017/0099092 A1* | 4/2017 | Kakishima | ........... H04B 7/0469 |
| 2019/0268056 A1* | 8/2019 | Wang | ................. H04B 7/06966 |
| 2019/0356379 A1 | 11/2019 | Takeda et al. | |

FOREIGN PATENT DOCUMENTS

| | | |
|---|---|---|
| CN | 110476450 A | 11/2019 |
| CN | 110731055 A | 1/2020 |

OTHER PUBLICATIONS

International Search Report issued in PCT/CN2020/140146 on Sep. 28, 2021 (7 pages).
Written Opinion of the International Searching Authority issued in PCT/CN2020/140146 on Sep. 28, 2021 (7 pages).

* cited by examiner

*Primary Examiner* — Kyaw Z Soe
(74) *Attorney, Agent, or Firm* — Osha Bergman Watanabe & Burton LLP

(57) ABSTRACT

The present disclosure provides a terminal and a base station. The terminal includes: a receiving unit configured to receive first information transmitted via a plurality of first beams; and a transmitting unit configured to transmit measurement results of the first information transmitted via at least a part of the first beams. The receiving unit is further configured to receive second information transmitted via a preferred beam of a plurality of second beams. The preferred beam is determined by a base station from the plurality of second beams according to measurement results of the first information transmitted via more than two first beams.

10 Claims, 5 Drawing Sheets

TERMINAL AND BASE STATION

TECHNICAL FIELD

The present disclosure relates to a field of wireless communication, and more particularly, to a terminal and a base station.

BACKGROUND

In order to meet the extremely high data rate requirements of the evolved 5G NR, a large-scale antenna array working in millimeter wave (mmWave) band has been regarded as a recommended technology in 5G communication. In a large-scale antenna array system, a large number of beams are used to communicate between a base station and a terminal by using beamforming technology. On the other hand, the application of large-scale antenna array brings many challenges and increases complexity of the system. For example, in order to achieve good communication effect, beam management is needed. Usually in beam management, an appropriate beam is selected to transmit data by beam measurement/reporting. When mmWave is used for communication, because beams generated by the large-scale antenna array are narrow, signaling overhead in beam measurement is significantly increased.

In addition, in high-mobility scenarios, beam status will change rapidly due to constant changes of a user's position and surrounding environment. It is difficult for existing beam measurement methods to keep up with such changes, resulting in degraded system performance.

For example, in an existing beam measurement method, the base station performs channel measurement by using reference signals such as synchronization signal blocks (SSB) and channel state information reference signal (CSI-RS), and selects beams according to measurement results. Generally, the base station first carries out coarse-grained beam measurement using a SSB signal. Then, for a data channel, CSI-RS is used for further fine-grained beam measurement. This leads to a large amount of signaling overhead for large-scale antenna arrays working in mmWave band, and it is difficult to keep up with environment changes in high-mobility scenarios.

SUMMARY

According to an aspect of the present disclosure, a terminal is provided, comprising: a receiving unit configured to receive first information transmitted via a plurality of first beams; and a transmitting unit configured to transmit measurement results of the first information transmitted via at least a part of the first beams, the receiving unit being further configured to receive second information transmitted via a preferred beam of a plurality of second beams, the preferred beam being determined by a base station from the plurality of second beams according to measurement results of the first information transmitted via more than two first beams.

According to an example of the present disclosure, in the aforementioned terminal, a width of the second beams is smaller than a width of the first beams or the same as the width of the first beams.

According to an example of the present disclosure, in the aforementioned terminal, the first beams and the second beams at least partially overlap, or a second beam is located between two adjacent first beams.

According to an example of the present disclosure, in the aforementioned terminal, the transmitting unit feeds back the measurement results of the first information transmitted via more than two first beams at once, or feeds back measurement results of the first information transmitted via one first beam at more than two time points in a predetermined time period.

According to an example of the present disclosure, in the aforementioned terminal, the transmitting unit transmits measurement results of at least a part of the plurality of first beams that have transmitted the first information with the best quality; or, the transmitting unit transmits measurement results of at least a random part of the plurality of first beams; or, the transmitting unit transmits measurement results of at least a part of beams in a specific number of the plurality of first beams that have transmitted the first information with the best quality; or, the transmitting unit transmits measurement results of at least a specific part of the plurality of first beams.

According to an example of the present disclosure, in the aforementioned terminal, the receiving unit is further configured to receive configuration information, the transmitting unit determines measurement results of which beams of the plurality of first beams are to be transmitted based on the configuration information.

According to an example of the present disclosure, in the aforementioned terminal, when the receiving unit determines that the measurement results of at least the specific part of the plurality of first beams are transmitted, the configuration information further includes a number and beam indexes of at least the specific part of beams.

According to another aspect of the present disclosure, a method performed by a terminal is provided, comprising: receiving first information transmitted via a plurality of first beams; transmitting measurement results of the first information transmitted via at least a part of the first beams; and receiving second information transmitted via a preferred beam of a plurality of second beams, the preferred beam being determined by a base station from the plurality of second beams according to measurement results of the first information transmitted via more than two first beams.

According to an example of the present disclosure, in the aforementioned method, a width of the second beams is smaller than a width of the first beams or the same as the width of the first beams.

According to an example of the present disclosure, in the aforementioned method, the first beams and the second beams at least partially overlap, or a second beam is located between two adjacent first beams.

According to an example of the present disclosure, in the aforementioned method, the measurement result of the first information transmitted via more than two first beams is fed back at once, or measurement results of the first information transmitted via one first beam is fed back at more than two time points in a predetermined time period.

According to an example of the present disclosure, in the aforementioned method, measurement results of at least a part of the plurality of first beams that have transmitted the first information with the best quality are transmitted; or, measurement results of at least a random part of the plurality of first beams are transmitted; or, measurement results of at least a part of beams in a specific number of the plurality of first beams that have transmitted the first information with the best quality are transmitted, or, measurement results of at least a specific part of the plurality of first beams are transmitted.

According to an example of the present disclosure, in the aforementioned method, configuration information is further received, and measurement results of which beams of the plurality of first beams are determined to be transmitted based on the configuration information.

According to an example of the present disclosure, in the aforementioned method, when the measurement results of at least the specific part of the plurality of first beams are transmitted, the configuration information further includes a number and beam indexes of at least the specific part of beams.

According to another aspect of the present disclosure, a base station is provided, comprising: a transmitting unit configured to transmit first information via a plurality of first beams; a receiving unit configured to receive measurement results of the first information transmitted via at least a part of the first beams; and a processing unit configured to determine a preferred beam from a plurality of second beams according to measurement results of the first information transmitted via more than two first beams, the transmitting unit being further configured to transmit second information to a terminal via the determined preferred beam.

According to another aspect of the present disclosure, a base station is provided, comprising: a transmitting unit configured to transmit first information via a plurality of first beams; a receiving unit configured to receive measurement results of the first information transmitted via at least a part of the first beams; and a processing unit configured to determine a preferred beam from a plurality of second beams according to measurement results of the first information transmitted via more than two first beams, the transmitting unit being further configured to transmit second information to a terminal via the determined preferred beam.

According to an example of the present disclosure, in the aforementioned base station, the processing unit determines the preferred beam from the plurality of second beams based on the measurement results, by using a correlation between the first beams and the second beams determined by a neural network pre-trained by inputting historical measurement results of the first beams and historical measurement results of the second beams as training data.

According to another aspect of the present disclosure, a method performed by a base station is provided, comprising: transmitting first information via a plurality of first beams; receiving measurement results of the first information transmitted via at least a part of the first beams; and determining a preferred beam from a plurality of second beams according to measurement results of the first information transmitted via more than two first beams; and further transmitting second information to a terminal via the determined preferred beam.

According to an example of the present disclosure, in the aforementioned method, the preferred beam is determined from the plurality of second beams based on the measurement results, by using a correlation between the first beams and the second beams determined by a neural network pre-trained by inputting historical measurement results of the first beams and historical measurement results of the second beams as training data.

BRIEF DESCRIPTION OF DRAWINGS

The above and other objects, features and advantages of the present disclosure will become more apparent by describing embodiments of the present disclosure in more detail in conjunction with accompanying drawings. The accompanying drawings are provided to provide a further understanding of the embodiments of the present disclosure, constitute a part of the specification, serve to explain the present disclosure together with the embodiments of the present disclosure, and do not constitute a limitation of the present disclosure. In the drawings, like reference numerals usually represent like parts or steps.

DETAILED DESCRIPTION

In order to make the objects, technical solutions and advantages of the present disclosure more obvious, exemplary embodiments according to the present disclosure will be described in detail below with reference to the accompanying drawings. Like reference numerals refer to like elements throughout the drawings. It should be appreciated that the embodiments described herein are merely illustrative and should not be construed as limiting the scope of the present disclosure. In addition, terminals described herein may include various types of terminals, such as vehicle terminals, User Equipment (UE), mobile terminals (or referred to as mobile stations) or fixed terminals. A base station described herein includes eNB, gNB and the like.

Figure 1:
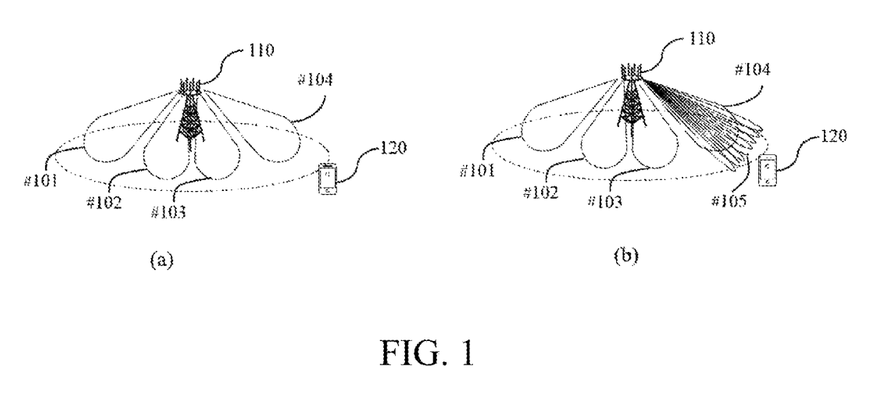
FIG. 1 is a schematic diagram showing that a base station performs beam selection by measuring SSB and CSI-RS.

FIGS. 1(a) and 1(b) are schematic diagrams showing that a base station performs beam selection by measuring SSB and CSI-RS. As shown in FIG. 1(a), a base station 110 first transmits a synchronization signal to UE 120 through beams #101, #102, #103 and #104. Based on the received synchronization signal, UE 120 measures the beams #101, #102, #103 and #104 with wide coverage, and reports measurement results to the base station 110 to indicate that the measurement result of beam #104 is the best. Then, as shown in FIG. 1(b), the base station 110 transmits a CSI-RS signal to the UE 120 through a plurality of beams with narrow coverage corresponding to the beam #104 according to the measurement results of the synchronization signal by the UE 120, and determines to use the beam #105 to transmit data to the user according to a measurement feedback of the UE 120 based on the CSI-RS signal.

In the methods shown in FIGS. 1(a) and 1(b), the UE first needs to perform beam measurement on wide beams that transmit SSB (hereinafter referred to as "SSB beams"), and then perform beam measurement on narrower beams that transmit CSI-RS (hereinafter referred to as "CSI-RS beams"), and feed back measurement results to the base station respectively, so that the base station can determine the beam that is finally used to transmit data to the UE. This leads to a large signaling overhead and increased complexity of the system, and it is difficult to adapt to high-speed changes of UE location in scenarios with high-speed movement.

In order to solve the above problems, in the embodiment according to the present disclosure, a correlation between first beams for transmitting first information and second beams for transmitting data, that is, second information, to the user can be determined in advance at the network side. Therefore, a device at the network side can determine a second beam for transmitting data to the UE only according to measurement results of a plurality of (i.e., more than two) first beams fed back by the UE by using the pre-determined correlation, without obtaining measurement results of the user for the second beams.

In the following description of the embodiments, SSB beams as the first beams and CSI-RS beams as the second beams will be described as an example. However, it should be understood that the present disclosure is not limited thereto. For example, the first beams may be specific CSI-RS beams, and the second beams may be other CSI-RS beams different from the first beams. In addition, in the coverage area, the first beams and the second beams can at least partially overlap. For example, a beam width of a first beam may be greater than that of a second beam, and one first beam may have a plurality of second beams corresponding to its coverage. For example, the first beams described above are SSB beams and the second beams are CSI-RS beams. Alternatively, the first beams and the second beams may not overlap, a second beam may be located between two adjacent first beams, and the beam width of the first beams is the same as that of the second beams. For example, both the first beams and the second beams are SSB beams or CSI-RS beams.

In addition, a beam measurement result described below may be one or more of information reflecting channel quality, such as Reference Signal Received Power (RSRP), Reference Signal Received Quality (RSRQ), Signal Interference plus Noise Ratio (SINR), and the like. In addition, the measurement result may be a measurement result fed back at layer L1 (e.g., feedback L1-RSRP, L1-RSRQ, L1-SINR, etc.), or a measurement result fed back at layer L3 (e.g., L3-RSRP). In addition, the measurement result may include measurement results for a primary cell (PCell), a secondary cell (SCell) and a primary and secondary cell (PSCell). In addition, it may be a measurement result of a serving cell, or a measurement result of a neighbor cell.

Figure 2:
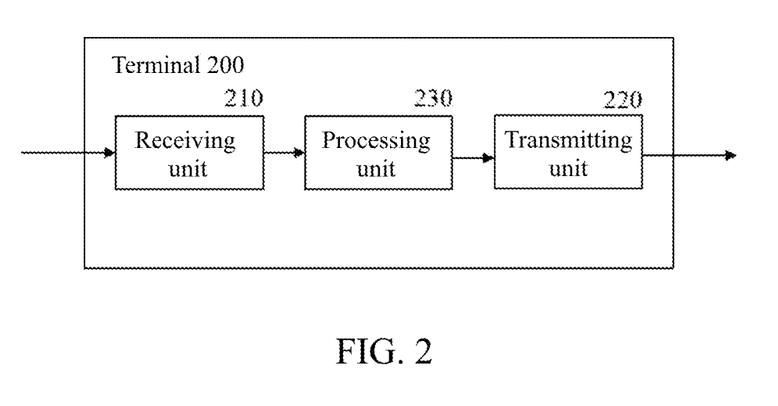
FIG. 2 is a schematic diagram showing a terminal involved in an embodiment of the present disclosure.

A terminal according to an embodiment of the present disclosure will be described with reference to FIG. 2. FIG. 2 is a schematic diagram of a terminal of an embodiment of the present disclosure. As shown in FIG. 2, the terminal 200 includes a receiving unit 210, a transmitting unit 220 and a processing unit 230. The receiving unit 210 receives information (e.g., a primary synchronization signal PSS or a secondary synchronization signal SSS) transmitted via a plurality of SSB beams from a base station. The processing unit 230 measures a quality of the information transmitted via the plurality of SSB beams. The transmitting unit 220 feeds back measurement results of the SSB beams to the base station, so that the base station can determine, according to the received measurement results, a preferred CSI-RS beam from a plurality of CSI-RS beams for transmitting downlink information. The receiving unit 210 receives the downlink information transmitted through the determined preferred beam.

According to an example of the present invention, the preferred CSI-RS beam is determined by the base station based on a correlation between the SSB beams and the CSI-RS beams. For example, the correlation is a mapping relationship between the SSB beams and the CSI-RS beams, which reflects information transmitted by which CSI-RS beam of the plurality of CSI-RS beams has the best quality, that is, which CSI-RS beam is the preferred beam, in the case that the measurement result of the SSB beams is a specific value. It should be noted that in this case, the more measurement results of SSB beams are transmitted by the transmitting unit 220, the more accurate the base station's estimation of the preferred beam is. However, in order to avoid excessive signaling overhead between the base station and the terminal, the number of SSB beams whose measurement results the transmitting unit 220 needs to feed back may be more than two.

According to an example of the present invention, the transmitting unit 220 may feed back a measurement result of one SSB beam to the base station each time, and the base station estimates the preferred CSI-RS beam based on measurement results fed back by the terminal several times within a predetermined time period. In addition, the transmitting unit 220 may also feed back measurement results of a plurality of SSB beams to the base station at once, and the base station may estimate the preferred CSI-RS beam based on these measurement results.

Figure 3:
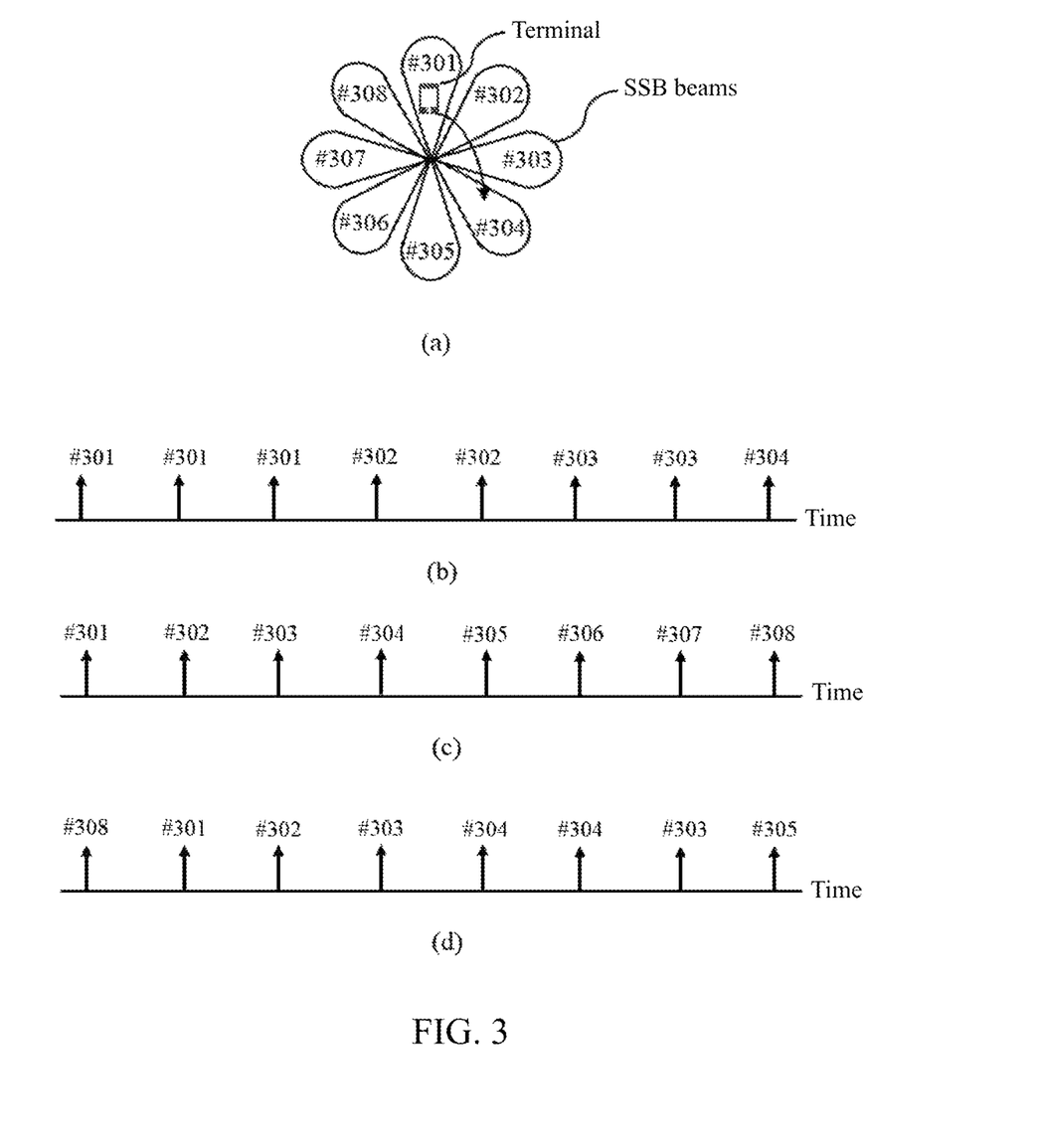
FIG. 3 is a diagram showing an example in which a terminal transmits a beam measurement result to a base station in an embodiment of the present disclosure.

FIG. 3 shows an example in which the transmitting unit 220 is feeding back measurement results of SSB beams to the base station. In FIG. 3, an example in which the transmitting unit 220 feeds back a measurement result of one SSB beam each time at a plurality of time points within a predetermined time period is shown, but it is also possible that the transmitting unit 220 feeds back a plurality of SSB beams shown in FIG. 3 to the base station at once.

As shown in FIG. 3(*a*), the receiving unit 210 receives information such as a primary synchronization signal PSS, a secondary synchronization signal SSS and the like from the base station through SSB beams with beam numbers of #301, #302, #303, #304, #305, #306, #307 and #308, respectively, and the processing unit 230 measures quality of these synchronization signals. Moreover, the terminal is moving from a coverage position of SSB beam #301 to a coverage position of SSB beam #304 according to a trajectory shown by the arrow.

According to an example of the present invention, in the process that the terminal moves from SSB beam #301 to SSB beam #304 in the arrow direction as shown in FIG. 3(*a*), the transmitting unit 220 feeds back a measurement result of one SSB beam that has transmitted the synchronization signal with the best quality to the base station each time, so that the transmitting unit sequentially transmits measurement results of SSB beams numbered #301, #301, #301, #302, #302, #303, #303 and #334 to the base station in the time direction. In addition, the SSB beam that the transmitting unit 220 feeds back its measurement result to the base station every time may not be the beam that has transmitted the synchronization signal with the best quality, but the beam that has transmitted the synchronization signal with the second, third and fourth best quality.

According to an example of the present invention, as shown in FIG. 3(*c*), the transmitting unit 220 may also select any SSB beam from the plurality of SSB beams shown in (a) each time, and transmit its measurement result. For example, in the time direction, the transmitting unit 220 sequentially transmits measurement results of SSB beams #301, #302, #303, #304, #305, #306, #307 and #308. The measurement result of which beam is selected to be transmitted each time is independent of the measurement result itself, and is arbitrary.

According to an example of the present invention, as shown in FIG. 3(*d*), the transmitting unit 220 may also determine a part of SSB beams that have transmitted the synchronization signal with the best quality from the plurality of SSB beams shown in (a) each time, and then select any SSB beam from this part of SSB beams to transmit its measurement result. For example, when the terminal moves along the trajectory shown in FIG. 3(a), the part of SSB beams determined by the terminal as having transmitted the synchronization signal with the best quality are numbered #301, #302, #303, #304, #305 and #308. Then as shown in figure (c), in the time direction, the transmitting unit 220 transmits the measurement result of any one of these beams each time.

According to an example of the present invention, the transmitting unit 220 may also transmit measurement results of SSB beams designated by the network side each time based on configuration at the network side. In this case, the transmitting unit 220 may determine a measurement result of which SSB beam to feed back each time, for example, based on an index of the beam to be fed back configured by the network side.

In addition, according to an example of the present invention, the transmitting unit may also determine, based on a DCI format of the network side, a measurement result of which SSB beam to feed back each time, and an interval of feeding back the SSB beam each time within the predetermined time period described in the figure.

In addition, as described above, in the case that the transmitting unit 220 is configured to feed back a plurality of SSB beams to the base station at once, still taking the situation shown in FIG. 3(a) as an example, the number of SSB beams that the transmitting unit 220 feeds back measurement results thereof to the base station each time may be 2 to 8. That is, the number of beams that the transmitting unit 220 feeds back measurement results thereof to the base station each time is two or more.

Specifically, the transmitting unit 220 may, for example, feed back measurement results of a plurality of SSB beams with the best quality from the plurality of SSB beams shown in FIG. 3(a) each time. Alternatively, according to an example of the present invention, measurement results of a plurality of arbitrary SSB beams may be fed back. Alternatively, according to an example of the present invention, the transmitting unit 220 may also determine a part of SSB beams that have transmitted the synchronization signal with the best quality from the received plurality of SSB beams, and then select any number of SSB beams from this part of SSB beams, and transmit their measurement results. Alternatively, according to an example of the present invention, the transmitting unit 220 may also transmit measurement results of a plurality of SSB beams designated by the network side based on the configuration at the network side. In this case, the transmitting unit 220 determines measurement results of which SSB beams should be specifically fed back based on the number and beam indexes of beams to be fed back configured by the network side.

According to an example of the present invention, the receiving unit 210 may also receive configuration information from the base station, and the transmitting unit 220 determines measurement results of which SSB beams to feed back to the base station based on the configuration information. For example, the configuration information may include a field for instructing the terminal how to feed back beam measurement results, which is hereinafter referred to as a reportBehaviorType field. According to an example of the present invention, a value of reportBehaviorType may take {Best, Random, Hybrid, Specific}, for example.

When the value of ReportBehavior is Best in the configuration information received by the receiving unit 210, the transmitting unit 220 feeds back a measurement result of one SSB beam that has transmitted the synchronization signal with the best quality to the base station each time in the predetermined time period, as shown in FIG. 3(b). Alternatively, according to an example of the present invention, the transmitting unit 220 may also feed back measurement results of a plurality of SSB beams that have transmitted the synchronization signal with the best quality at once.

When the value of reportBehaviorType in the configuration information received by the receiving unit 210 is Random, the transmitting unit 220 randomly feeds back a measurement result of one SSB beam to the base station each time within the predetermined time period, as shown in FIG. 3(c). Alternatively, according to an example of the present invention, the transmitting unit 220 may also transmit measurement results of a random plurality of SSB beams at once.

When the value of reportBehaviorType in the configuration information received by the receiving unit 210 is Hybrid, the transmitting unit 220 may also determine a part of SSB beams that have transmitted the synchronization signal with the best quality from the plurality of SSB beams shown in (a) each time within the predetermined time period, and then select any SSB beam from this part of SSB beams to send its measurement result, as shown in FIG. 3(d). Alternatively, according to an example of the present invention, the transmitting unit 220 may also feed back any number of SSB beams in the part of SSB beams that have transmitted the synchronization signal with the best quality at once.

When the value of reportBehaviorType in the configuration information received by the receiving unit 210 is Specific, the transmitting unit 220 transmits a measurement result of one SSB beam designated by the network side each time within the predetermined time period. Alternatively, as described above, the transmitting unit 220 may transmit measurement results of a plurality of SSB beams designated by the network side at once. The configuration information may further include a field for specifying the one or more SSB beams, which is referred to as SpecificBeamReport, for example. In this field, for example, a numberOfBeams field and a BeamIndex field may be included, the former is used to indicate the number of SSB beams that the transmitting unit 220 is to transmit measurement results thereof, and the latter is used to indicate indexes of the SSB beams that the transmitting unit 220 is to transmit measurement results thereof.

According to an example of the present invention, the aforementioned configuration information may be transmitted, for example, by high-layer signaling, or by physical layer. For example, when the configuration information is transmitted by high-layer signaling, according to an example of the present disclosure, the aforementioned configuration information may also be a CSI-ReportConfig information element described in the 3GPP standard TS38.331. In this case, the reportBehaviorType field and the SpecificBeamReport field are appended to the CSI-ReportConfig information element.

According to an example of the present invention, when the aforementioned configuration information is transmitted by high-layer signaling, and in the case that the transmitting unit 220 is configured by the aforementioned configuration information to transmit measurement results of one or more SSB beams designated by the network side (e.g., the aforementioned reportBehaviorType is "Specific"), it is also possible to designate a part of SSB beams in the configuration information, and then instruct the terminal by low-layer signaling to specifically feed back measurement results of which beams of this part of SSB beams. For example, a part of SSB beams are designated by the aforementioned SpecificBeamReport field, and then one or both of physical layer signaling MAC CE (MAC Control element) and DCI (Downlink Control Information) are used to instruct the terminal to specifically feed back measurement results of which beams of this part of SSB beams.

According to an example of the present invention, when the aforementioned configuration information is transmitted by high-layer signaling, and in the case that the transmitting unit 220 is configured by the aforementioned configuration information to transmit measurement results of one or more SSB beams designated by the network side (e.g., the aforementioned reportBehaviorType is "Specific"), the terminal is instructed to specifically feed back measurement results of which beams directly by low-layer signaling. For example, the aforementioned configuration information does not contain the field of SpecificBeamReport, but directly instruct the terminal to specifically feed back measurement results of which beams through one or both of the physical layer signaling MAC CE and DCI.

According to the terminal of this embodiment, measurement results of SSB beams can be appropriately fed back to the base station, so that the base station can determine the preferred CSI-RS beam only based on these measurement results. Therefore, signaling interaction between the base station and the terminal is greatly saved, and it is applicable to scenarios where the terminal moves at high speed.

Figure 4:
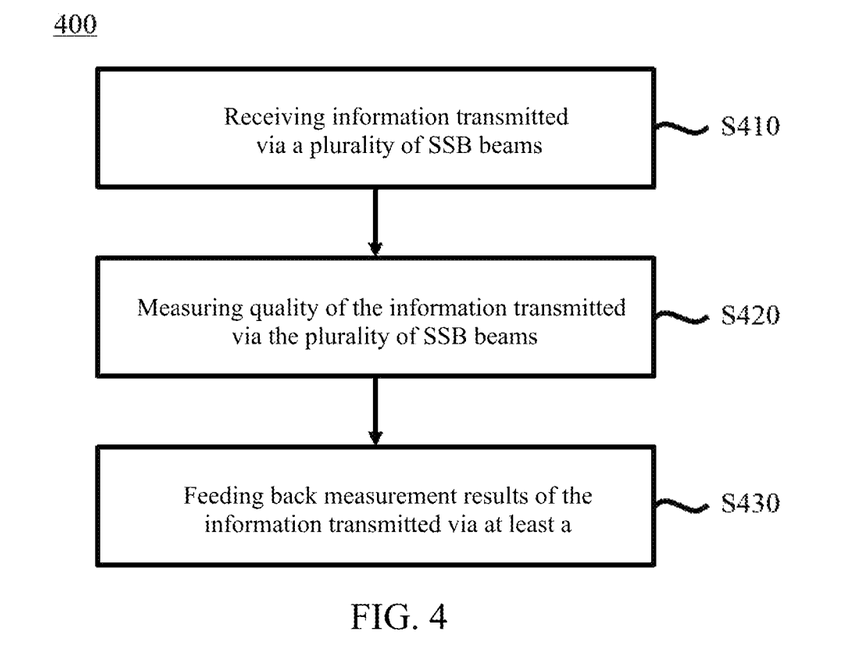
FIG. 4 is a flowchart showing a method performed by a terminal involved in an embodiment of the present disclosure.

The terminal according to the embodiment of the present invention has been described above with reference to FIG. 3. A method performed by a terminal will be described below with reference to FIG. 4. FIG. 4 is a flowchart of a method performed by a terminal according to an embodiment of the present invention.

As shown in FIG. 4, the method 400 includes step S410. In step S410, information (e.g., a primary synchronization signal PSS or a secondary synchronization signal SSS) transmitted via a plurality of SSB beams is received. The method 400 further includes step S420. In step S420, quality of the information transmitted via the plurality of SSB beams is measured.

The method 400 further includes step S430. In step S430, measurement results of the information transmitted via at least a part of SSB are fed back to the base station, so that the base station can determine, according to the received measurement result, a preferred CSI-RS beam from the plurality of CSI-RS beams for transmitting downlink information.

According to an example of the present invention, in order to make the base station's estimation about the preferred beam more accurate, in step S430, measurement results of as many SSB beams are transmitted as possible. However, in order to avoid excessive signaling overhead between the base station and the terminal, it is also possible to transmit measurement results of more than two SSB beams.

According to an example of the present invention, in step S430, a measurement result of one SSB beam may be fed back to the base station each time, and the feedback may be performed for a plurality of times in a specific period. Alternatively, measurement results of a plurality of SSB beams may be fed back to the base station at once.

In step S430, in the case that a measurement result of one SSB beam is fed back to the base station each time, the following transmission manners may be adopted:

According to an example of the present invention, in step S430, a measurement result of one SSB beam that has transmitted the synchronization signal with the best quality may be fed back to the base station each time. Alternatively, the SSB beam whose measurement result is fed back to the base station each time may not be the beam that has transmitted the synchronization signal with the best quality, but the beam that has transmitted the synchronization signal with the second, third and fourth best quality.

According to an example of the present invention, in step S430, any SSB beam may be selected from a plurality of SSB beams each time and its measurement result may be transmitted.

According to an example of the present invention, in step S430, a part of SSB beams that have transmitted the synchronization signal with the best quality may be determined from a plurality of SSB beams each time, and then any SSB beam may be selected from this part of SSB beams and its measurement result may be transmitted.

According to an example of the present invention, in step S430, it is also possible to transmit measurement results of SSB beams designated by the network side each time based on configuration at the network side. In this case, for example, a measurement result of which SSB beam is to be fed back each time may be determined based on an index of the beam to be fed back configured by the network side.

According to an example of the present invention, in step S430, it is also possible to determine a measurement result of which SSB beam is to be fed back each time and an interval of feeding back the SSB beam each time within the predetermined time period described in the figure based on a DCI format of the network side.

In addition, in the case that a plurality of SSB beams are fed back to the base station at once in step 430, measurement results of multiple SSB beams with the best quality from the plurality of SSB beams may be fed back at once. Alternatively, according to an example of the present invention, it is also possible to feed back measurement results of a plurality of arbitrary SSB beams. Alternatively, according to an example of the present invention, it is also possible to determine a part of SSB beams that have transmitted the synchronization signal with the best quality from the received SSB beams, and then select any number of SSB beams from this part to transmit their measurement results. Alternatively, according to an example of the present invention, it is also possible to transmit measurement results of a plurality of SSB beams designated by the network side based on configuration at the network side. In this case, measurement results of which SSB beams should be specifically fed back may be determined based on the number and beam indexes of beams to be fed back configured by the network side.

According to an example of the present invention, in step S410, configuration information may also be received from the base station, and in step S430, based on the configuration information, it is determined measurement results of which SSB beams are to be fed back to the base station. For example, as described above, the configuration information may include a reportBehaviorType field, a SpecificBeamReport field, and the like.

According to the method performed by the terminal in this embodiment, measurement results of SSB beams can be appropriately fed back to the base station, so that the base station can determine the preferred CSI-RS beam only based on these measurement results.

Figure 5:
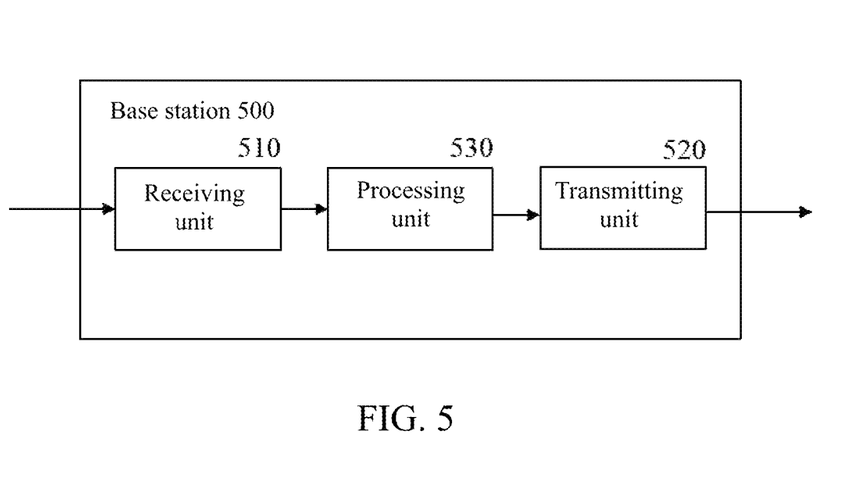
FIG. 5 is a schematic diagram showing a base station involved in an embodiment of the present disclosure.

A base station according to an embodiment of the present disclosure will be described below with reference to FIG. 5. As shown in FIG. 5, the base station 500 includes a receiving unit 510, a transmitting unit 520, and a processing unit 530. The transmitting unit 520 transmits information (e.g., a primary synchronization signal PSS or a secondary synchronization signal SSS) to a terminal via a plurality of SSB beams. The receiving unit 230 receives measurement results of a synchronization signal transmitted via the plurality of SSB beams by the terminal. The processing unit 530 determines a preferred CSI-RS beam for transmission of downlink information according to the received measurement result. As described above, according to an example of the present invention, the base station determines the preferred CSI-RS beam based on a correlation between SSB beams and CSI-RS beams.

According to an example of the present invention, instead of directly determining one preferred CSI-RS beam by the processing unit 530, the processing unit 530 may determine a plurality of candidates of the preferred CSI-RS beam. The transmitting unit transmits information related to these candidate beams to the terminal, and the terminal continues to perform fine-grained measurement on beams of these candidate beams to select the preferred CSI-RS beam.

As mentioned above, the transmitting unit 520 may transmit configuration information to the terminal, to control measurement results of which SSB beams are received by the receiving unit 510. For example, the transmitting unit 520 may transmit the configuration information including the reportBehaviorType field and the SpecificBeamReport field to the terminal. The configuration information may be transmitted by high-layer signaling or physical layer signaling, and the configuration information may also be CSI-ReportConfig. In addition, the transmitting unit 520 may also transmit physical layer information such as MAC CE, DCI and the like to the terminal, so as to instruct the terminal to specifically feed back measurement results of which SSB beams when the value of the reportBehaviorType field is specific.

As described above, the correlation between SSB beams and CSI-RS beams refers to a mapping relationship between the SSB beams and the CSI-RS beams, for example. According to an example of the present invention, the processing unit 530 determines the preferred CSI-RS beam from the plurality of CSI-RS beams based on the measurement results of the received SSB beams by using a pre-trained neural network. The neural network may reflect the above mapping relationship between the SSB beams and the CSI-RS beams, that is, when the measurement results of the SSB beams are specific values, information transmitted by which CSI-RS beam of a plurality of CSI-RS beams has the best quality.

According to an example of the present disclosure, the neural network may be any Deep Neural Networks (DNN) known to those skilled in the art, for example, Feedforward Neural Networks (FNN), Convolutional Neural Networks (CNN), Recurrent Neural Networks (RNN) and the like. In addition, according to an example of the present disclosure, the neural network may be set in the base station 500, or in other network elements, for example, in the core network. Next, the neural network being set in the base station 500 will be taken as an example for description.

Figure 6:
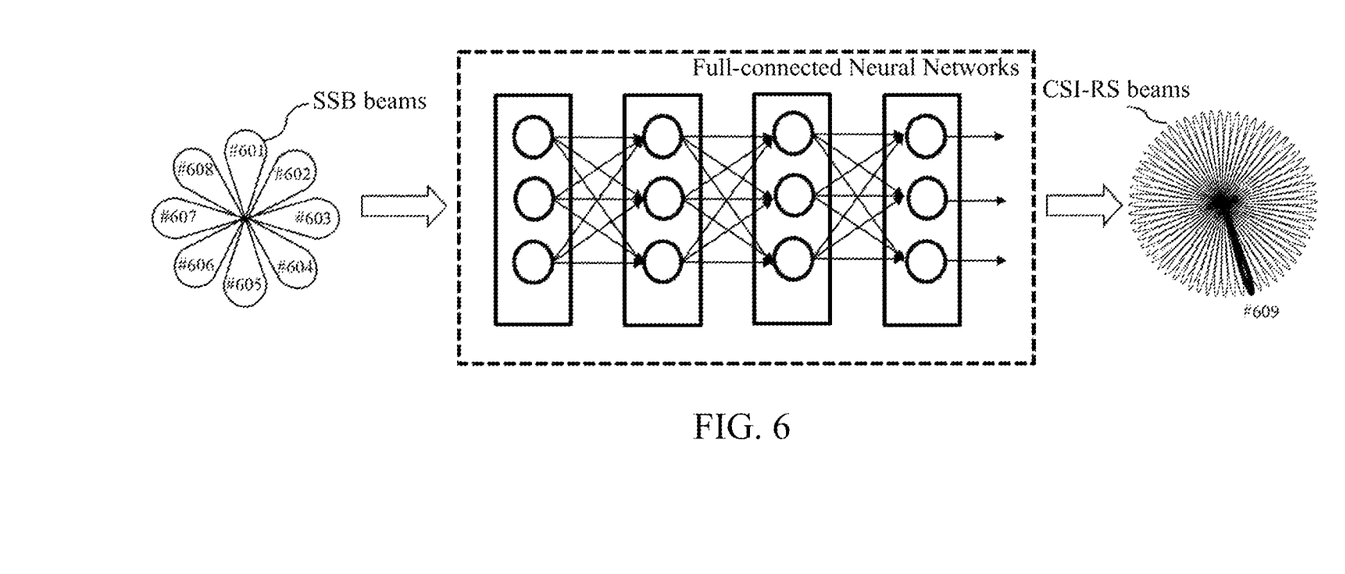
FIG. 6 is a schematic diagram showing a neural network involved in an embodiment of the present disclosure.

FIG. 6 shows a schematic diagram of determining CSI-RS beams by using 4-layer Full-connected Neural Networks. Herein, the number of layers of the neural network is only an example, and it is not limited to four layers. The processing unit 530 inputs measurement results of a plurality of SSB beams received by the receiving unit 510 into the neural network, as shown in FIG. 6, which illustrates the case of inputting the measurement results of all SSB beams (eight SSB beams numbered #601, #602, #603, #604, #605, #606, #607 and #608). However, as described above, the input SSB beams may also be any number of beams more than two. Based on the mapping relationship between SSB beams and CSI-RS beams obtained through training, the neural network outputs the preferred CSI-RS beam #609 from 64 CSI-RS beams corresponding to coverage of the SSB beams according to the above input.

According to an example of the present disclosure, in order to adapt to scenarios where the terminal moves at high speed, information input into the neural network may also include information related to movement of the terminal, so as to optimize the final output result.

The above information related to the movement of the terminal is, for example, Doppler frequency shift information, a sequence of channel quality information, and the like. The sequence of channel quality information herein refers to channel quality information received by the receiving unit 510 within a period of time, such as RSRP, CSI and the like of SSB beams received within a period of time. In this case, the output of the neural network may include information such as a position of the terminal, a speed of the terminal, a moving direction of the terminal, etc., in addition to the preferred CSI-RS beam.

Next, training of the neural network is explained.

As mentioned above, in this embodiment, the neural network reflects the mapping relationship between SSB beams and CSI-RS beams, and can find out a preferred CSI-RS beam from CSI-RS beams with narrower beam width based on measurement results of two or more SSB beams with wide beam width. Therefore, according to an example of the present invention, when training the neural network, a large number of historical measurement results of SSB beams and historical measurement results of CSI-RS beams measured by the terminal may be input to the neural network as training data in advance. According to an example of the present invention, historical measurement results of CST-RS beams related to historical measurement results of SSB beams may also be input as training data. For example, in the case shown in FIG. 1 of the present invention, measurement results of CSI-RS beams corresponding to beam #104, which is determined based on measurement results of SSB beams, may be input as the historical measurement results of CSI-RS beams. By learning from these massive training data, the neural network can grasp information transmitted via which CSI-RS beam of a plurality of CSI-RS beams has the best quality when the measurement results of SSB beams are specific values.

In addition, the training data input into the neural network may also include a lot of information related to movement of the terminal, such as the above-mentioned Doppler frequency shift information, a sequence of channel quality information and the like. In this case, corresponding position, speed and moving direction of the terminal are also used as training data, so that the neural network can learn a corresponding model relationship between the Doppler frequency shift information, the sequence of channel quality information, etc. and the position, speed and moving direction of the terminal.

According to an example of the present invention, in order to collect training data from the terminal, it is also possible to inform the terminal, in the configuration information transmitted by the transmitting unit 520, that beam measurement results it will feed back will be used for training the neural network. For example, a reportUsageType field may also be included in the configuration information, and values of this field are "offline" and "online". When the reportUsageType field is configured as "offline", measurement results fed back by the terminal is used as historical measurement results for the training of the neural network. In this case, the receiving unit 510 receives historical measurement results of SSB beams and historical measurement results of CSI-RS beams transmitted from the terminal, and inputs them into the neural network for the training of the neural network. When the reportUsageType field is configured as "online", measurement results fed back by the terminal are used to estimate the optimal beam. In this case, the receiving unit receives measurement results of a plurality of SSB beams fed back from the terminal and inputs them into the neural network, so that the neural network can output the preferred CSI-RS beam or a plurality of candidates of the preferred CSI-RS beam.

According to the base station of this embodiment, the preferred beam is determined from a plurality of CSI-RS beams to transmit data to the terminal only according to measurement results of a plurality of SSB beams fed back by the terminal, without measurement results of CSI-RS beams by the terminal. Therefore, signaling interaction between the base station and the terminal can be greatly saved while ensuring quality of the transmitted data, and it can be applied to scenarios where the terminal moves at high speed.

Figure 7:
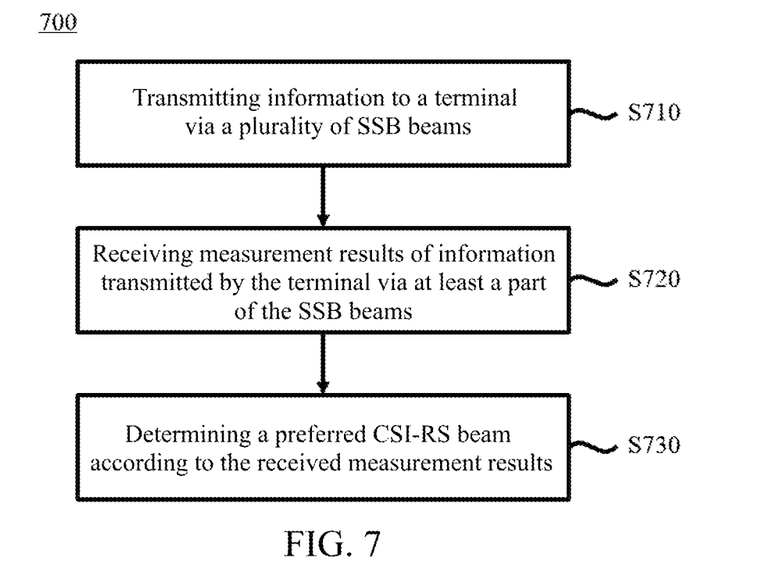
FIG. 7 is a flowchart showing a method performed by a base station involved in an embodiment of the present disclosure.

The base station according to the embodiment of the present invention has been described above with reference to FIG. 5 and FIG. 6. A method performed by a base station will be described below with reference to FIG. 7. FIG. 7 is a flowchart of a method performed by a base station according to an embodiment of the present invention.

As shown in FIG. 7, the method 700 includes step S710. In step S710, information (e.g., a primary synchronization signal PSS or a secondary synchronization signal SSS) is transmitted to a terminal via a plurality of SSB beams. In addition, according to an example of the present invention, in step S710, configuration information may also be transmitted to the terminal, to control measurement results of which SSB beams are to be transmitted by the terminal. For example, as described above, the configuration information including the reportBehaviorType field and the SpecificBeamReport field may be transmitted to the terminal. The configuration information may be transmitted by high-layer signaling or physical layer signaling, and the configuration information may also be CSI-ReportConfig. In addition, in step S710, physical layer information such as MAC CE, DCI and the like may also be transmitted to the terminal, so as to instruct the terminal to specifically feed back measurement results of which SSB beams when the value of the reportBehaviorType field is specific.

The method 700 further includes step S720. In step S720, measurement results by the terminal of information transmitted via at least a part of the SSB beams is received.

The method 700 further includes step S730. In step S730, a preferred CSI-RS beam is determined according to the received measurement results. As described above, according to an example of the present invention, in step S730, the preferred CSI-RS beam is determined based on a correlation between SSB beams and CSI-RS beams.

According to an example of the present invention, in step S730, instead of directly determining one preferred CSI-RS beam, a plurality of candidates for the preferred CSI-RS beam may be determined. The base station transmits information related to these candidate beams to the terminal, and the terminal continues to perform fine-grained measurement on beams of these candidate beams to select the preferred CST-RS beam.

According to an example of the present invention, in step S730, based on the measurement results of the SSB beams received in step S720, the preferred CSI-RS beam is determined from a plurality of CST-RS beams using a neural network that has been trained in advance as described above.

According to the method performed by the base station in this embodiment, signaling interaction between the base station and the terminal can be greatly saved while ensuring quality of the transmitted data, and it can be applied to scenarios where the terminal moves at high speed.

<Hardware Structure>

In addition, block diagrams used in the description of the above embodiments illustrate blocks in units of functions. These functional blocks (structural blocks) may be implemented in arbitrary combination of hardware and/or software. Furthermore, means for implementing respective functional blocks is not particularly limited. That is, the respective functional blocks may be implemented by one apparatus that is physically and/or logically jointed; or more than two apparatuses that are physically and/or logically separated may be directly and/or indirectly connected (e.g. wired and/or wirelessly), and the respective functional blocks may be implemented by these apparatuses.

Figure 8:
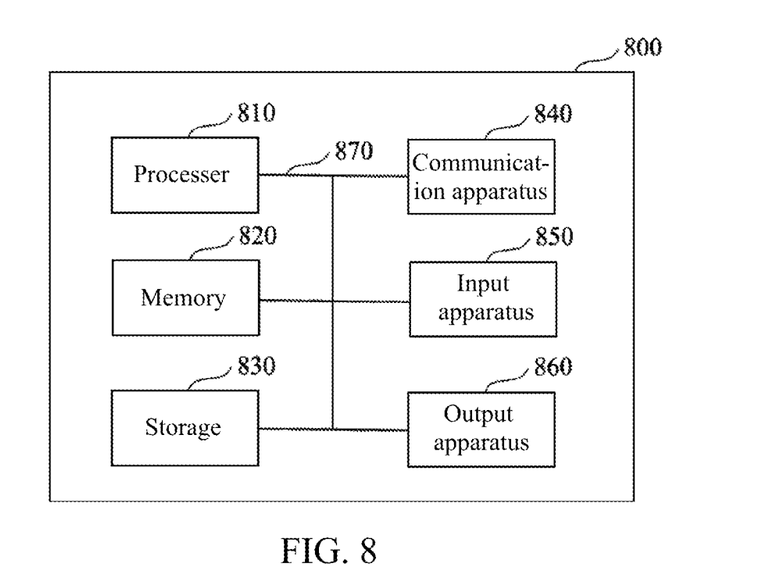
FIG. 8 is a schematic diagram showing a hardware structure of a device involved in an embodiment of the present disclosure.

For example, a device (such as a terminal, a base station and the like) in an embodiment of the present disclosure may function as a computer that executes the processes of the wireless communication method of the present disclosure. FIG. 8 is a schematic diagram of a hardware structure of a device 800 involved in an embodiment of the present disclosure. The above device 800 may be constituted as a computer apparatus that physically comprises a processor 810, a memory 820, a storage 830, a communication apparatus 840, an input apparatus 850, an output apparatus 860, a bus 870 and the like In addition, in the following description, terms such as "apparatus" may be replaced with circuits, devices, units, and the like. The hardware structure of the user terminal and the base station may include one or more of the respective apparatuses shown in the figure, or may not include a part of the apparatuses.

For example, only one processor 810 is illustrated, but there may be multiple processors. Furthermore, processes may be performed by one processor, or processes may be performed by more than one processor simultaneously, sequentially, or with other methods. In addition, the processor 810 may be installed by more than one chip.

Respective functions of any of the device 800 may be implemented, for example, by reading specified software (program) on hardware such as the processor 810 and the memory 820, so that the processor 810 performs computations, controls communication performed by the communication apparatus 840, and controls reading and/or writing of data in the memory 820 and the storage 830.

The processor 810, for example, operates an operating system to control the entire computer. The processor 810 may be constituted by a Central Processing Unit (CPU), which includes interfaces with peripheral apparatuses, a control apparatus, a computing apparatus, a register and the like. For example, the processing unit described above may be implemented by the processor 810.

In addition, the processor 810 reads programs (program codes), software modules and data from the storage 830 and/or the communication apparatus 840 to the memory 820, and execute various processes according to them. As for the program, a program causing computers to execute at least a part of the operations described in the above embodiments may be employed. For example, the processing unit of the terminal 700 may be implemented by a control program stored in the memory 820 and operated by the processor 810, and other functional blocks may also be implemented similarly.

The memory 820 is a computer-readable recording medium, and may be constituted, for example, by at least one of a Read Only Memory (ROM), an Erasable Programmable ROM (EPROM), an Electrically EPROM (EEPROM), a Random Access Memory (RAM) and other appropriate storage media. The memory 820 may also be referred to as a register, a cache, a main memory (a main storage apparatus) and the like. The memory 820 may store executable programs (program codes), software modules and the like for implementing a method involved in an embodiment of the present disclosure.

The storage 830 is a computer-readable recording medium, and may be constituted, for example, by at least one of a flexible disk, a Floppy® disk, a magneto-optical disk (e.g., a Compact Disc ROM (CD-ROM) and the like), a digital versatile disk, a Blu-ray® disk, a removable disk, a hard driver, a smart card, a flash memory device (e.g., a card, a stick and a key driver), a magnetic stripe, a database, a server, and other appropriate storage media. The storage 830 may also be referred to as an auxiliary storage apparatus.

The communication apparatus 840 is a hardware (transceiver device) performing communication between computers via a wired and/or wireless network, and is also referred to as a network device, a network controller, a network card, a communication module and the like, for example. The communication apparatus 840 may include a high-frequency switch, a duplexer, a filter, a frequency synthesizer and the like to implement, for example, Frequency Division Duplex (FDD) and/or Time Division Duplex (TDD). For example, the transmitting unit, the receiving unit and the like described above may be implemented by the communication apparatus 840.

The input apparatus 850 is an input device (e.g., a keyboard, a mouse, a microphone, a switch, a button, a sensor and the like) that receives input from the outside. The output apparatus 860 is an output device (e.g., a display, a speaker, a Light Emitting Diode (LED) light and the like) that performs outputting to the outside. In addition, the input apparatus 850 and the output apparatus 860 may also be an integrated structure (e.g., a touch screen).

Furthermore, the respective apparatuses such as the processor 810 and the memory 820 are connected by the bus 870 that communicates information. The bus 870 may be constituted by a single bus or by different buses between the apparatuses.

Furthermore, the terminal may comprise hardware such as a microprocessor, a Digital Signal Processor (DSP), an Application Specified Integrated Circuit (ASIC), a Programmable Logic Device (PLD), a Field Programmable Gate Array (FPGA), etc., and the hardware may be used to implement a part of or all of the respective functional blocks. For example, the processor 810 may be installed by at least one of these hardware.

(Variations)

In addition, terms illustrated in the present specification and/or terms required for understanding of the present specification may be substituted with terms having the same or similar meaning. For example, a channel and/or a symbol may also be a signal (signaling). Furthermore, the signal may be a message. A reference signal may be abbreviated as an "RS", and may also be referred to as a pilot, a pilot signal and so on, depending on the standard applied. Furthermore, a component carrier (CC) may also be referred to as a cell, a frequency carrier, a carrier frequency, and the like.

Furthermore, information, parameters and so on described in this specification may be represented in absolute values or in relative values with respect to specified values, or may be represented by other corresponding information. For example, radio resources may be indicated by specified indexes. Furthermore, formulas and the like using these parameters may be different from those explicitly disclosed in this specification.

Names used for parameters and the like in this specification are not limited in any respect. For example, since various channels (Physical Uplink Control Channels (PUCCHs), Physical Downlink Control Channels (PDCCHs), etc.) and information elements may be identified by any suitable names, the various names assigned to these various channels and information elements are not limitative in any respect.

Information, signals and the like described in this specification may be represented by using any of a variety of different technologies. For example, data, instructions, commands, information, signals, bits, symbols, chips, etc. possibly referenced throughout the above description may be represented by voltages, currents, electromagnetic waves, magnetic fields or particles, optical fields or photons, or any combination thereof.

In addition, information, signals and the like may be output from higher layers to lower layers and/or from lower layers to higher layers. Information, signals and the like may be input or output via a plurality of network nodes.

Information, signals and the like that are input or output may be stored in a specific location (for example, in a memory), or may be managed in a control table. Information, signals and the like that are input or output may be overwritten, updated or appended. Information, signals and the like that are output may be deleted. Information, signals and the like that are input may be transmitted to other apparatuses.

Reporting of information is by no means limited to the manners/embodiments described in this specification, and may be implemented by other methods as well. For example, reporting of information may be implemented by using physical layer signaling (for example, Downlink Control Information (DCI), Uplink Control Information (UCI)), higher layer signaling (for example, RRC (Radio Resource Control) signaling, broadcast information (Master Information Blocks (MIBs), System Information Blocks (SIBs), etc.), MAC (Medium Access Control) signaling), other signals or combinations thereof.

In addition, physical layer signaling may also be referred to as L1/L2 (Layer 1/Layer 2) control information (L1/L2 control signals), L1 control information (L1 control signal) and the like. Furthermore, RRC signaling may also be referred to as RRC messages, for example, RRC connection setup messages, RRC connection reconfiguration messages, and so on. Furthermore, MAC signaling may be reported by using, for example, MAC Control Elements (MAC CEs).

Furthermore, notification of prescribed information (for example, notification of "being X") is not limited to being performed explicitly, and may be performed implicitly (for example, by not performing notification of the prescribed information or by notification of other information).

Decision may be performed by a value (0 or 1) represented by 1 bit, or by a true or false value (Boolean value)

represented by TRUE or FALSE, or by a numerical comparison (e.g., comparison with a prescribed value).

Software, whether referred to as "software", "firmware", "middleware", "microcode" or "hardware description language", or called by other names, should be interpreted broadly to mean instructions, instruction sets, code, code segments, program codes, programs, subprograms, software modules, applications, software applications, software packages, routines, subroutines, objects, executable files, execution threads, procedures, functions and so on.

In addition, software, commands, information, etc. may be transmitted and received via a transport medium. For example, when software is transmitted from web pages, servers or other remote sources using wired technologies (coaxial cables, fibers, twisted pairs, Digital Subscriber Lines (DSLs), etc.) and/or wireless technologies (infrared ray, microwave, etc.), these wired technologies and/or wireless technologies are included in the definition of the transport medium.

The terms "system" and "network" used in this specification may be used interchangeably.

In this specification, terms like "Base Station (BS)", "wireless base station", "eNB", "gNB", "cell", "sector", "cell group", "carrier" and "component carrier" may be used interchangeably. A base station is sometimes referred to as terms such as a fixed station, a NodeB, an eNodeB (eNB), an access point, a transmitting point, a receiving point, a femto cell, a small cell and the like.

A base station is capable of accommodating one or more (for example, three) cells (also referred to as sectors). In the case where the base station accommodates a plurality of cells, the entire coverage area of the base station may be divided into a plurality of smaller areas, and each smaller area may provide communication services by using a base station sub-system (for example, a small base station for indoor use (a Remote Radio Head (RRH)). Terms like "cell" and "sector" refer to a part of or an entirety of the coverage area of a base station and/or a sub-system of the base station that provides communication services in this coverage.

In this specification, terms such as "Mobile Station (MS)", "user terminal", "User Equipment (UE)", and "terminal" may be used interchangeably. The mobile station is sometimes referred by those skilled in the art as a user station, a mobile unit, a user unit, a wireless unit, a remote unit, a mobile device, a wireless device, a wireless communication device, a remote device, a mobile user station, an access terminal, a mobile terminal, a wireless terminal, a remote terminal, a handset, a user agent, a mobile client, a client, or some other appropriate terms.

Furthermore, a wireless base station in this specification may also be replaced with a user terminal. For example, for a structure in which communication between a wireless base station and a user terminal is replaced with communication between a plurality of user terminals (Device-to-Device, D2D), the respective manners/embodiments of the present disclosure may also be applied. In this case, functions provided by the electronic device described above may be regarded as functions provided by a user terminal. Furthermore, the words "uplink" and "downlink" may also be replaced with "side". For example, an uplink channel may be replaced with a side channel.

Also, a user terminal in this specification may be replaced with a wireless base station. In this case, functions provided by the above user terminal may be regarded as functions provided by the first communication device and the second communication device.

In this specification, specific actions configured to be performed by the base station sometimes may be performed by its upper nodes in certain cases. Obviously, in a network composed of one or more network nodes having base stations, various actions performed for communication with terminals may be performed by the base stations, one or more network nodes other than the base stations (for example, Mobility Management Entities (MMEs), Serving-Gateways (S-GWs), etc., may be considered, but not limited thereto)), or combinations thereof.

The respective manners/embodiments described in this specification may be used individually or in combinations, and may also be switched to use during execution. In addition, orders of processes, sequences, flow charts and so on of the respective manners/embodiments described in this specification may be re-ordered as long as there is no inconsistency. For example, although various methods have been described in this specification with various units of steps in exemplary orders, the specific orders as described are by no means limitative.

The manners/embodiments described in this specification may be applied to systems that utilize Long Term Evolution (LTE), Advanced Long Term Evolution (LTE-A, LTE-Advanced), Beyond Long Term Evolution (LTE-B, LTE-Beyond), the super 3rd generation mobile communication system (SUPER 3G), Advanced International Mobile Telecommunications (IMT-Advanced), the 4th generation mobile communication system (4G), the 5th generation mobile communication system (5G), Future Radio Access (FRA), New Radio Access Technology (New-RAT), New Radio (NR), New radio access (NX), Future generation radio access (FX), Global System for Mobile communications (GSM® R), Code Division Multiple Access 3000 (CDMA 3000), Ultra Mobile Broadband (UMB), IEEE 920.11 (Wi-Fi @), IEEE 920.16 (WiMAX®), IEEE 920.20, Ultra-Wide Band (UWB), Bluetooth® and other appropriate wireless communication methods, and/or next-generation systems that are enhanced based on them.

Terms such as "based on" as used in this specification do not mean "based on only", unless otherwise specified in other paragraphs. In other words, terms such as "based on" mean both "based on only" and "at least based on."

Any reference to units with designations such as "first", "second" and so on as used in this specification does not generally limit the quantity or order of these units. These designations may be used in this specification as a convenient method for distinguishing between two or more units. Therefore, reference to a first unit and a second unit does not imply that only two units may be employed, or that the first unit must precedes the second unit in several ways.

Terms such as "deciding (determining)" as used in this specification may encompass a wide variety of actions. The "deciding (determining)" may regard, for example, calculating, computing, processing, deriving, investigating, looking up (e.g., looking up in a table, a database or other data structures), ascertaining, etc. as performing the "deciding (determining)". In addition, the "deciding (determining)" may also regard receiving (e.g., receiving information), transmitting (e.g., transmitting information), inputting, outputting, accessing (e.g., accessing data in a memory), etc. as performing the "deciding (determining)". In addition, the "deciding (determining)" may further regard resolving, selecting, choosing, establishing, comparing, etc. as performing the "deciding (determining)". That is, the "deciding (determining)" may regard certain actions as performing the "deciding (determining)".

As used herein, terms such as "connected", "coupled", or any variation thereof mean any direct or indirect connection or coupling between two or more units, and may include the presence of one or more intermediate units between two units that are "connected" or "coupled" to each other. Coupling or connection between the units may be physical, logical or a combination thereof. For example, "connection" may be replaced with "access." As used in this specification, two units may be considered as being "connected" or "coupled" to each other by using one or more electrical wires, cables and/or printed electrical connections, and, as a number of non-limiting and non-inclusive examples, by using electromagnetic energy having wavelengths in the radio frequency region, microwave region and/or optical (both visible and invisible) region.

When terms such as "including", "comprising" and variations thereof are used in this specification or the claims, these terms, similar to the term "having", are also intended to be inclusive. Furthermore, the term "or" as used in this specification or the claims is not an exclusive or.

Although the present disclosure has been described above in detail, it should be obvious to a person skilled in the art that the present disclosure is by no means limited to the embodiments described in this specification. The present disclosure may be implemented with various modifications and alterations without departing from the spirit and scope of the present disclosure defined by the recitations of the claims. Consequently, the description in this specification is for the purpose of illustration, and does not have any limitative meaning to the present disclosure.

The invention claimed is:

1. A terminal comprising:
a receiving unit configured to receive first information transmitted via a plurality of first beams; and
a transmitting unit configured to transmit measurement results of the first information transmitted via at least a part of the first beams,
the receiving unit being further configured to receive second information transmitted via a preferred beam of a plurality of second beams,
the preferred beam being determined by a base station from the plurality of second beams according to measurement results of the first information transmitted via more than two first beams.

2. The terminal of claim 1, wherein, a width of the second beams is smaller than a width of the first beams or the same as the width of the first beams.

3. The terminal of claim 1, wherein, the first beams and the second beams at least partially overlap, or the second beam is located between two adjacent first beams.

4. The terminal of claim 1, wherein, the transmitting unit feeds back the measurement results of the first information transmitted via more than two first beams at once, or feeds back measurement result of the first information transmitted via one first beam at more than two time points in a predetermined time period.

5. The terminal of claim 1, wherein,
the transmitting unit transmits measurement results of at least a part of the plurality of first beams that have transmitted the first information with best quality; or,
the transmitting unit transmits measurement results of at least a random part of the plurality of first beams; or,
the transmitting unit transmits measurement results of at least a part of beams in a specific number of the plurality of first beams that have transmitted the first information with the best quality; or,
the transmitting unit transmits measurement results of at least a specific part of the plurality of first beams.

6. The terminal of claim 5, wherein,
the receiving unit is further configured to receive configuration information,
the transmitting unit determines measurement results of which beams of the plurality of first beams are to be transmitted based on the configuration information.

7. The terminal of claim 6, wherein, when the receiving unit determines that the measurement results of at least the specific part of the plurality of first beams are transmitted, the configuration information further includes a number and beam indexes of at least the specific part of beams.

8. A base station comprising:
a transmitting unit configured to transmit first information via a plurality of first beams;
a receiving unit configured to receive measurement results of the first information transmitted via at least a part of the first beams; and
a processing unit configured to determine a preferred beam from a plurality of second beams according to measurement results of the first information transmitted via more than two first beams,
the transmitting unit being further configured to transmit second information to a terminal via the determined preferred beam.

9. The base station of claim 8, wherein, the processing unit determines the preferred beam from the plurality of second beams based on the measurement results, by using a correlation between the first beams and the second beams determined by a neural network pre-trained by inputting historical measurement results of the first beams and historical measurement results of the second beams as training data.

10. A method for a terminal, comprising:
receiving first information transmitted via a plurality of first beams;
transmitting measurement results of the first information transmitted via at least a part of the first beams; and
receiving second information transmitted via a preferred beam of a plurality of second beams,
the preferred beam being determined by a base station from the plurality of second beams according to measurement results of the first information transmitted via more than two first beams.

* * * * *